United States Patent
Finkenberger et al.

(10) Patent No.: US 6,298,674 B1
(45) Date of Patent: Oct. 9, 2001

(54) METHOD FOR OPERATING A SUBCRITICALLY AND TRANSCRITICALLY OPERATED VEHICLE AIR CONDITIONER

(75) Inventors: Thomas Finkenberger, Kernen-Stetten; Florian Kauf, Stuttgart; Jürgen Wertenbach, Fellbach, all of (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/625,795

(22) Filed: Jul. 26, 2000

(30) Foreign Application Priority Data

Jul. 29, 1999 (DE) .................................... 199 35 731

(51) Int. Cl.$^7$ .................................................... F25B 1/00
(52) U.S. Cl. ................................................. 62/115; 62/498
(58) Field of Search ............................. 62/115, 239, 498

(56) References Cited

U.S. PATENT DOCUMENTS

| | | | |
|---|---|---|---|
| 5,497,631 | * 3/1996 | Lorentzen et al. | 62/115 |
| 5,685,160 | * 11/1997 | Abersfelder et al. | 62/115 |
| 5,901,560 | * 5/1999 | Heile et al. | 62/115 |

* cited by examiner

*Primary Examiner*—William E. Tapolcai
(74) *Attorney, Agent, or Firm*—Mark P. Calcaterra

(57) ABSTRACT

The invention relates to a method for operating a subcritically and transcritically operated vehicle air conditioner having a vapor compression circuit in which in which a compressor, a gas cooler, an expansion valve and an evaporator are connected in series and form an integral closed cycle. On the high-pressure side of the vapor compression circuit, for the purpose of offering refrigerating capacity, a pressure is produced which is supercritical with reference to the critical pressure of the refrigerant circulating in the circuit, and a subcritical pressure is reached simultaneously on the low-pressure side of the circuit. Thermal energy is fed via the evaporator to the refrigerant cooled down on the low-pressure side with the refrigerant mass flow being regulated by the compressor and the desired high pressure being set by means of an expansion valve. During the starting operation of the vehicle air conditioner the refrigerant mass flow is set directly to a required value and the refrigerant pressure is set in accordance with at least one prescribed parameter, and the air conditioner is regulated upon the overshooting of safety pressure limits P1–P4, the regulation depending upon which safety pressure limits are overshot.

9 Claims, 2 Drawing Sheets

US 6,298,674 B1

METHOD FOR OPERATING A SUBCRITICALLY AND TRANSCRITICALLY OPERATED VEHICLE AIR CONDITIONER

The invention relates to a method for operating a subcritically and transcritically operated vehicle air conditioner.

BACKGROUND

DE 4432272 C2 describes a method for operating a refrigerating apparatus for air conditioning vehicles. The vapour compression circuit has at least in each case one compressor, one gas cooler, one throttling means and one evaporator. The refrigerating capacity is regulated by a compressor which controls the refrigerant mass flow. The refrigeration efficiency is a function of high pressure in the case of supercritical heat output at the gas cooler. The desired high pressure is set by means of an expansion valve.

EP 0 424 474 B1 describes a method for transcritical and supercritical operation of a vapour compression circuit. The air-conditioning circuit has a compressor, a cooler, throttling means and an evaporator. The refrigeration efficiency is a function of high pressure in the case of supercritical heat output at the cooler. The high pressure is regulated by variation of the refrigerant quantity on the high-pressure side of the circuit.

With this type of operation of a vehicle air conditioner, it is disadvantageous that upon starting up the vehicle air conditioner, the refrigerant mass flow and the high pressure do not immediately rise to the desired value. This is to be ascribed, for example, to the fact that additional pressure drops are produced in the system, and the refrigerant mass distribution in the overall system does riot correspond to the desired distribution. It is particularly disadvantageous when determining the optimum high pressure to use the refrigerant temperature at the gas cooler outlet, since this is itself a function of the high pressure, and thus subjected to incessant fluctuations.

The object of the invention is to improve a vehicle air conditioner so as to permit efficient starting up of the conditioner and efficient and reliable operation of the conditioner.

SUMMARY

A method according to the invention is for operating a subcritically and transcritically operated vehicle air conditioner having a vapour compression circuit in which in which a compressor, a gas cooler, an expansion valve and an evaporator are connected in series and form an integral closed cycle. On the high-pressure side of the vapour compression circuit, for the purpose of offering refrigerating capacity, a pressure is produced which is supercritical with reference to the critical pressure of the refrigerant circulating in the circuit, and a subcritical pressure is reached simultaneously on the low-pressure side of the circuit. Thermal energy is fed via the evaporator to the refrigerant cooled down on the low-pressure side with the refrigerant mass flow being regulated by the compressor and the desired high pressure being set by means of an expansion valve. During the starting operation of the vehicle air conditioner, the refrigerant mass flow is set directly to a required value and the refrigerant pressure is set in accordance with at least one prescribed parameter, and the air conditioner is regulated upon the overshooting of safety pressure limits P1-P4, the regulation depending upon which safety pressure limits are overshot.

BRIEF DESCRIPTION OF THE DRAWINGS

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which.

DETAILED DESCRIPTION

Figure 1:
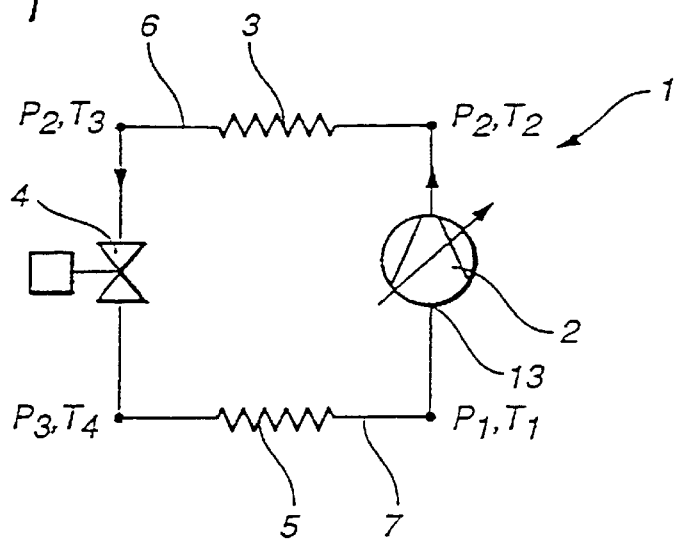
FIG. 1 shows diagrammatically in a schematic sketch a vapour compression circuit which works using the method according to the invention and has a regulable compressor and a regulable expansion valve.

A vapour compression circuit working using the method according to the invention is provided in FIG. 1 with a regulable compressor 2 and a regulable expansion valve 4. Represented by numeral 1 is a vapour compression circuit which includes, connected successively one after another in series, regulable compressor 2, a gas cooler 3, regulable expansion valve 4 as a throttling means, and an evaporator 5. The compressor 2 can be regulated in this case with reference to its throughput. The expansion valve 4 is likewise regulable.

Figure 2:
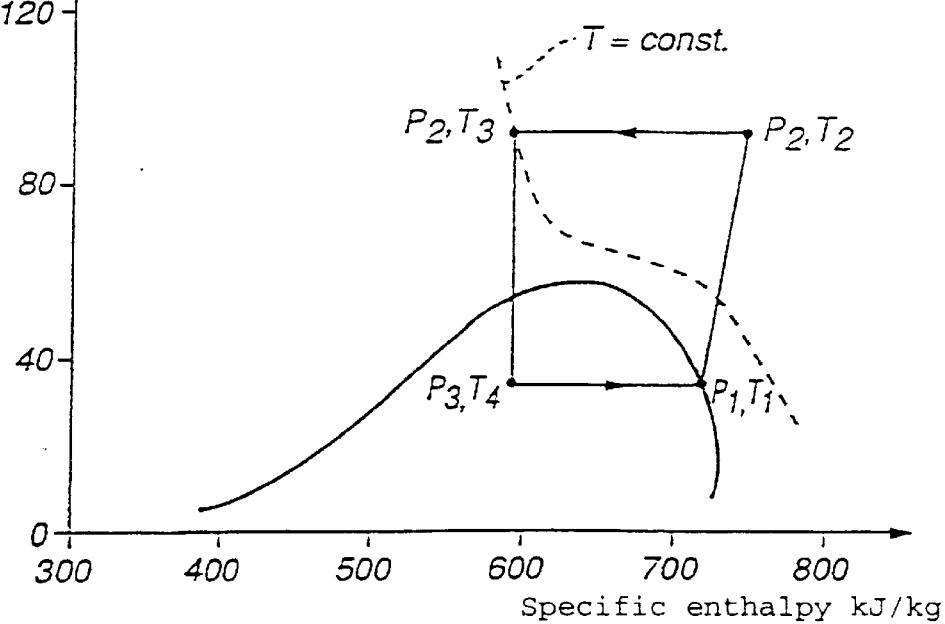
FIG. 2 shows an enthalpy/pressure diagram, associated with the circuit of FIG. 1, of a transcritical process.

If the compressor 2 is working under a load, in accordance with FIG. 2 it compresses a refrigerant quantity from an initial pressure P1 to a higher pressure P2, the refrigerant temperature rising from T1 to T2. The compressed gaseous refrigerant is now cooled down at constant pressure to a temperature T3 in the gas cooler 3 via a refrigerant, for example cold air or water, flowing around said gas cooler. When flowing through the expansion valve 4, the refrigerant is expanded with constant erithalpy to a pressure P3, which corresponds to the initial pressure P1, the refrigerant being cooled down further to a temperature T4 which is in the liquefaction range of the refrigerant. When the two-phase gas/liquid mixture of the refrigerant thus produced reaches the evaporator 5, the liquid fraction evaporates, or the very cool gas fraction is heated there, picking up heat from outside. The initial temperature T1 is reached again in this case. The refrigerating capacity offered at the evaporator 5 is calculated from the product of the mass flow of the refrigerant and the enthalpy difference between the high-pressure and the low-pressure sides 5, 6 of the circuit 1. The compressor 2 is of regulable design here in order to meet the associated demand for refrigerating capacity. As a result, the throughput of refrigerant through the compressor 2, and thus the mass flow in the circuit 1 can be adapted to this demand.

In the case of a supercritical circuit, the heat output on the high-pressure side is performed at a pressure below the critical pressure. In the case of a transcritical circuit, the heat output is performed on the high-pressure side at refrigerant temperatures in the vicinity of or above the critical temperature at a pressure above the critical pressure. In the case of supercritical heat output in the gas cooler, the optimum high pressure, which permits the maximum efficiency of the conditioner between useful power and power used, is a function of the refrigerant temperature at the gas cooler outlet.

A characteristic which calculates the optimum high pressure as a function of the refrigerant temperature at the gas cooler outlet or of the ambient temperature can be determined as a function of the efficiencies of the components used. The high pressure is regulated using a P1 controller in the case of a deviation between the actual and desired high pressures, and using a P controller in the case of a larger deviation, with the result that the expansion valve is completely opened or closed such that the difference between the actual and desired high pressures is reached after as short a time as possible within the permissible deviation.

Figure 3:
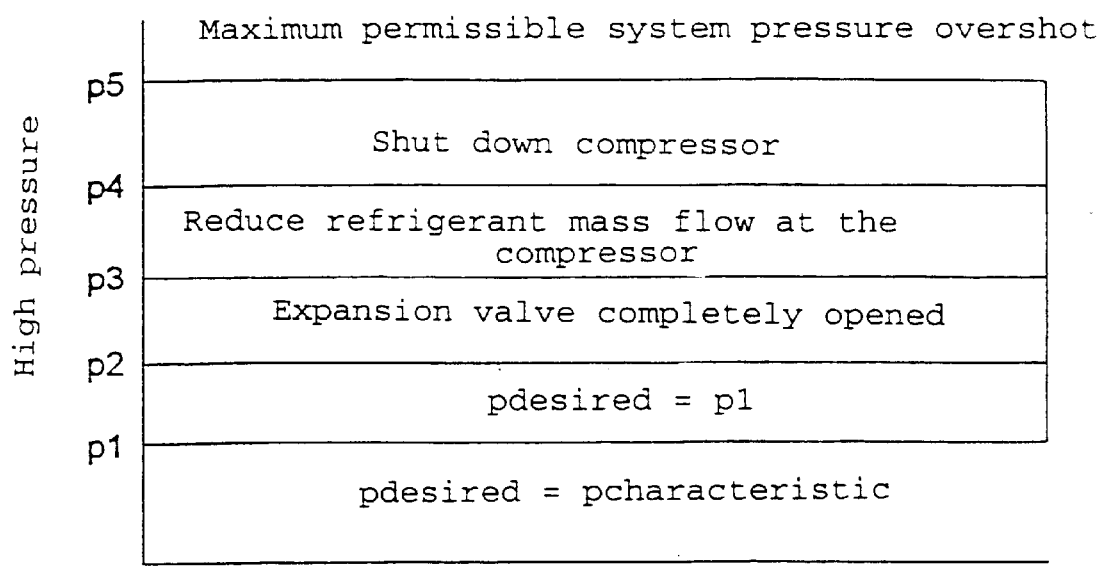
FIG. 3 shows a table for representing the overshooting of a safety value of the high pressure, together with the different relevant pressure ranges.

The different limiting ranges for the high pressure are represented qualitatively in a table in FIG. 3. A pressure level p1 is prescribed as safety value upon the overshooting of which regulation is performed as a function of different pressure levels. Up to a pressure p1, the air conditioner is in the normal mode, in which the high pressure is calculated as a function of a prescribed characteristic. In a safety range, the high pressure p1 is prescribed as desired value for a high pressure p1<p<p2 calculated using the characteristic. The expansion valve is opened completely for an actual high pressure of p>p2. The refrigerant mass flow at the compressor is reduced for a high pressure p>p3. The compressor is shut down for a high pressure p>p4. If the pressure level overshoots p3>p2, the circulating refrigerant mass flow is regulated in reverse with the aid of the compressor. If the pressure level overshoots p4>p3, the compressor is shut down and no more refrigerant circulates. The pressure level p4 is to be selected sufficiently below the maximum permissible system pressure p5.

An essential advantage of the inventive method is that the vehicle air conditioner delivers a higher refrigerating capacity, a safety measure having been taken to the effect that the high pressure in the system does not overshoot the permissible system pressure.

Although the invention has been described in detail with reference to certain preferred embodiments and specific examples, variations and modification exist within the scope and spirit of the invention as described and as defined in the following claims.

What is claimed is:

1. A method for operating a subcritically and transcritically operated vehicle air conditioner having a vapour compression circuit in which refrigerant circulates, the circuit including a compressor, a gas cooler, an expansion valve and an evaporator which are connected in series and form an integral closed cycle, wherein in a high pressure side of the circuit a pressure is produced that is supercritical with reference to the critical pressure of the refrigerant circulating in the circuit and a subcritical pressure is reached simultaneously on a low pressure side of the circuit, refrigerant mass flow being regulated by the compressor and a desired high pressure of the refrigerant being set by the expansion valve, the method comprising the steps:

(a) setting the mass flow of refrigerant in the vapour compression circuit to a required value;

(b) setting the refrigerant pressure in accordance with at least one prescribed parameter; and (c) regulating the air conditioner in the event that at least one of a plurality of safety pressure limits are overshot, the regulation dependent upon which of the safety pressure limits are overshot.

2. The method according to claim 1, and further including the step of regulating the compressor to limit refrigerant mass flow to a prescribed value in the case of start-up operation at a high outside temperature or a high refrigerant pressures.

3. The method according to claim 1, and further including the step of opening the expansion valve to its full open position and maximizing air mass flow at the gas cooler in the event of start-up operation at a high outside temperature or a high refrigerant pressure.

4. The method according to claim 1 and further including the step of limiting drive power of the compressor to a prescribed value in the event of start-up operation at a high outside temperature or a high refrigerant temperature.

5. The method according to claim 1 and further including the step of determining compressor drive power from suitable state variables of the refrigerant circuit in the event of start-up operation at a high outside temperature r a high refrigerant pressures.

6. The method according to claim 1 and further including the step of setting the predetermined high pressure after overshooting a first one of the safety pressure limits.

7. The method according to claim 1, and further including the step of opening the expansion valve to its full open position after overshooting of a second one of the safety pressure limits.

8. The method according to claim 1, and further including the step of regulating the mass flow of the refrigerant in reverse upon overshooting of a third one of the safety pressure limits.

9. The method according to claim 1, and further including the step of shutting down the compressor upon overshooting of a fourth one of the safety pressure limits.

* * * * *